F. J. NICOLET.
SPRING WHEEL.
APPLICATION FILED JUNE 19, 1912.
1,065,386.
Patented June 24, 1913.
2 SHEETS—SHEET 1.
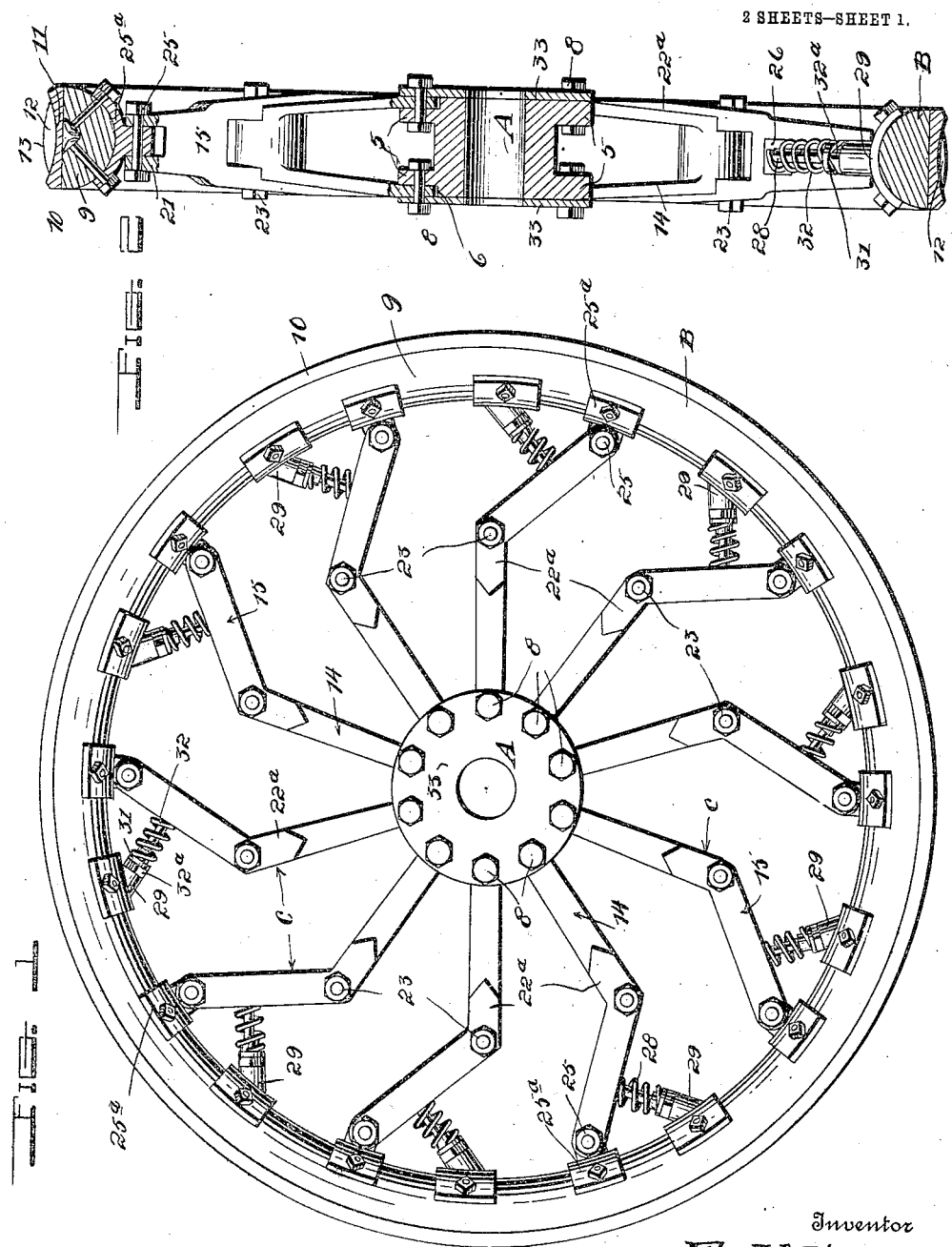
Witnesses
Inventor
F. J. Nicolet.
By 
Attorneys F. J. NICOLET.
SPRING WHEEL.
APPLICATION FILED JUNE 19, 1912.
1,065,386.
Patented June 24, 1913.
2 SHEETS—SHEET 2.
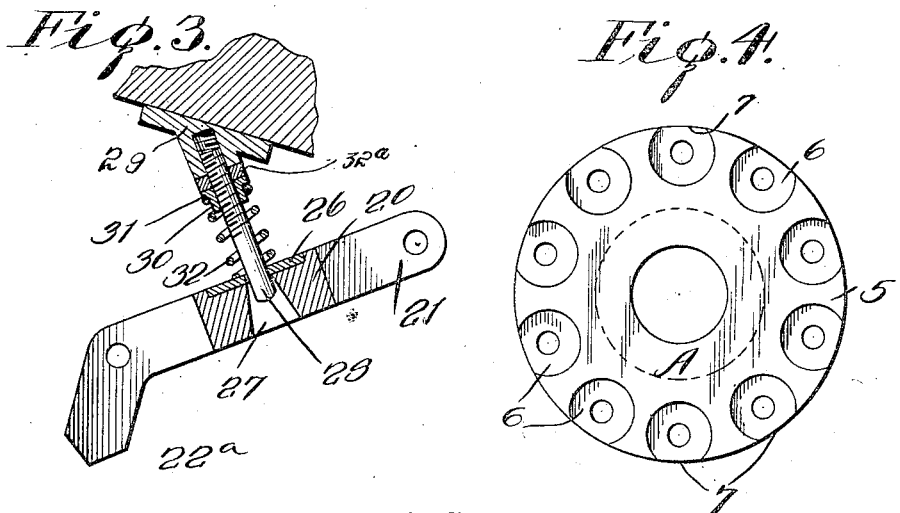
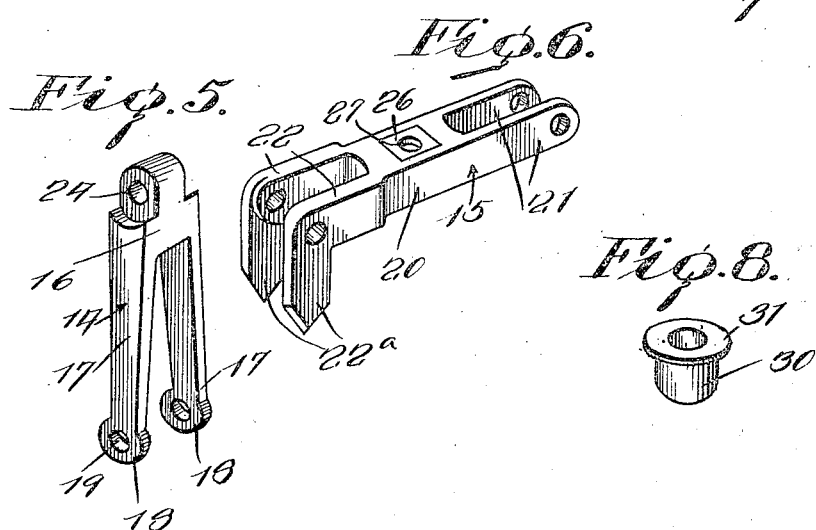
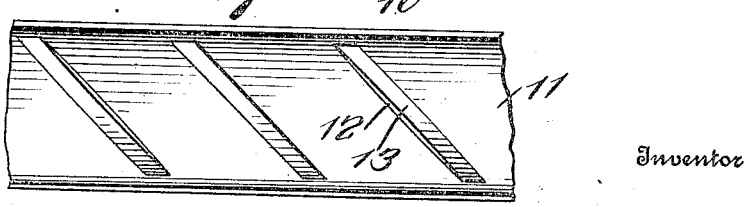
Witnesses
Inventor
F. J. Nicolet
By
Attorneys

UNITED STATES PATENT OFFICE.

FRANK J. NICOLET, OF STOCKDALE, OHIO.

SPRING-WHEEL.

1,065,386.  Specification of Letters Patent.  Patented June 24, 1913.

Application filed June 19, 1912. Serial No. 704,700.

*To all whom it may concern:*

Be it known that I, FRANK J. NICOLET, a citizen of the United States, residing at Stockdale, in the county of Pike, State of Ohio, have invented certain new and useful Improvements in Spring-Wheels; and I do hereby declare the following to be a full, clear, and exact description of the invention, such as will enable others skilled in the art to which it appertains to make and use the same.

This invention relates to improvements in spring wheels.

The principal object of the invention is to provide a novel construction of spring wheels adapted for use in connection with carriages, wagons, automobiles, bicycles or any other form of vehicle.

Another object of the invention is to provide a resilient wheel which will take up all shocks and jars incident to the passage of a vehicle over rough roads.

A further object of the invention is to provide a wheel of the character described in which any of the parts may be readily removed and new ones replaced should they become worn or damaged in any way.

A still further object of the invention is to provide a wheel of the character described which is composed of a minimum number of parts, is therefore simple in construction, and is cheap to manufacture.

With these and other objects in view, the invention consists in the construction and novel combination of parts hereinafter fully described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

In the drawings: Figure 1 is a side view of a resilient wheel constructed in accordance with my invention, Fig. 2 is a transverse section therethrough, Fig. 3 is a detail sectional view of one of the cushioning means, parts thereof being shown in elevation, Fig. 4 is a detail side elevation of the hub, the covering cap being removed, Fig. 5 is a perspective view of the inner section of one of the spokes, Fig. 6 is a similar view of the outer section of one of the spokes, Fig. 7 is a fragmentary plan view of the tire, and Fig. 8 is a detail perspective view of one of the sleeves.

Like reference numerals designate corresponding parts in all the figures of the drawings.

Referring to the drawings, the wheel comprises a hub A, a rim B and a plurality of spokes C.

The hub A includes a spaced pair of peripheral flanges 5—5, and formed in the outer face of each flange is a series of spaced marginal circular recesses 6 which merge with the periphery of the flange, as at 7. Projecting through each flange 5 and centrally of each recess 6 is a pivot bolt 8.

The inner face 9 of the rim B is transversely convexed throughout its entirety, and disposed around the periphery of said rim is a tire 10 which is formed with a transversely concaved tread 11 from which projects a series of spaced calks 12, said calks being disposed at an inclination and having its outer surface 13 convexed.

Each spoke C includes an inner section 14 and an outer section 15. The inner section 14 includes a body 16 and a pair of spaced legs 17—17 which terminate at their ends in heads 18—18, said heads being each centrally formed with a transverse opening 19 adapted to be engaged with the respective pivot pins 8. The inner sections 14 normally extend radially from the hub A. The outer sections 15 each include a body portion 20 from which projects opposite pairs of legs 21—21 and 22—22 respectively, the latter terminating in angular end portions 22ª—22ª. Each of the legs 22 is respectively pivoted at its angle by means of a bolt 23 passed therethrough and through the opening 24 formed in the outer end of the body 16 of said inner section. The outer section 15, extended, is disposed at a tangent with respect to the hub A, and has the free ends of the legs 21 thereof pivotally connected, as at 25, to a bearing 25ª which is secured to the inner face 9 of the rim B. The body 20 is provided on its upper face with a rectangular metallic plate 26, and this plate and body is formed with a flared opening 27 for receiving the free end of a guide rod 28, the other end of said rod being threaded and engaged with a socket element 29 which is fixedly secured to the inner face 9 of the rim B. It will be observed in this connection that the guide rod 28 is normally disposed at right angles to the outer section 15 of the spoke. Slidably mounted upon the rod 28 is a sleeve 30 which is provided at its outer end with a flange 31. A coil spring 32 is disposed around the rod intermediate the plate 26 and the flange 31 above mentioned. The tension of this spring is regulated by a nut 32ª, as will be readily understood.
Cap plates 33—33 are each disposed against the respective outer faces of the hub A, and are retained thereon by means of bolts 8. These plates serve not only to retain the heads 18 of the inner sections 14 against lateral movement, but also serve to prevent dust and other foreign elements entering the recess 6 of the hub.

What is claimed is:

In a spring wheel, the combination with a hub and rim, of a plurality of spokes pivotally connected at their ends to the hub and rim and consisting of inner and outer pivotally connected sections, the outer section of each spoke being disposed at a tangent to the hub and formed with a transverse opening, a guide rod disposed at right angles to the outer section and having its outer end connected to the rim, the inner end of said rod operating in the opening of the outer section, a coil spring disposed around the rod and bearing against the outer section, and tensioning means carried by the rod and engageable with the other end of the spring.

In testimony whereof, I affix my signature, in presence of two witnesses.

FRANK J. NICOLET.

Witnesses:
   FISHER DANIELS,
   CLAUDE KELLER.